H. G. FARLEY.
MACHINE FOR GRINDING THE EDGES OF GLASS PLATES.
APPLICATION FILED SEPT. 11, 1915. RENEWED APR. 25, 1917.
1,328,242.                                    Patented Jan. 13, 1920.
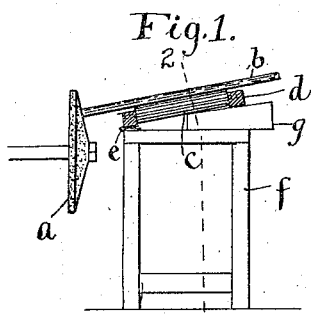
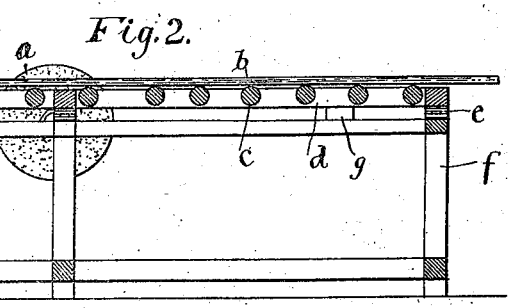
Inventor:
Henry G. Farley
by S. W. Bates Atty.

UNITED STATES PATENT OFFICE.

HENRY G. FARLEY, OF PORTLAND, MAINE.

MACHINE FOR GRINDING THE EDGES OF GLASS PLATES.

1,328,242.     Specification of Letters Patent.    Patented Jan. 13, 1920.

Application filed September 11, 1915, Serial No. 50,139. Renewed April 25, 1917. Serial No. 164,533.

*To all whom it may concern:*

Be it known that I, HENRY G. FARLEY, of Portland, in the county of Cumberland and State of Maine, have invented certain new and useful Improvements in Machines for Grinding the Edges of Glass Plates, of which the following is a specification.

My invention relates to a machine for grinding the edges of glass plates and it relates particularly to means for supporting the weight of the plate while leaving it free to be manipulated by the hands of the operator. The invention is more specially designed for grinding the edges of long and narrow plates such as are very difficult to handle in the ordinary manner where the glass is directly supported and held against the wheel by several operators.

This latter mode of operation in the case of heavy plates requires the labor of a relatively large number of men and it is the object of my invention to provide simple means by which the glass plates may be directly supported, taking the weight from the operator while allowing it to slide freely in a substantially horizontal direction whereby the grinding may be done with the least expenditure of force and with the least amount of labor.

The invention consists essentially of a grinding wheel with antifriction points of support adjacent to the wheel for sustaining the glass in a position where its edges may be presented to the grinding surface of the wheel and where it may be readily slipped along the supporting surfaces by the operator.

My invention may best be understood by reference to the accompanying drawing in which—

Figure 1 is an end elevation of a machine constructed in accordance with my invention, Fig. 2 is a section taken on the line 2—2 of Fig. 1.

Referring to Figs. 1 and 2 of the drawing, *a* represents a suitable grinding wheel having one of its grinding surfaces disposed in an upright position. This surface may be the flat grinding surface of the wheel or it may be the rim but preferably I use a flat conical wheel and use the conical surface for grinding the edges of the plate.

The glass plate rests adjacent to the grinding wheel on antifriction points of support in such a position that its edges may be presented to the grinding face of the wheel.

In practice I make use of a series of rolls *c* for this purpose and as here shown the rolls are journaled in a frame *d* so that they may be tilted toward or from the grinding face of the wheel to accurately adjust the grinding surface to make the desired angle with the face of the glass.

The edge of the glass is usually ground at right angles to the face of the glass or substantially so and the frame *d* is usually tilted to bring the glass at right angles to the conical grinding surface of the wheel.

Any suitable means may be employed for tilting the frame but as herein shown I make use of wedges *g* for lifting the rear portion of the frame, the forward edge of the frame being connected by hinges *e* with the stand or bench *f*.

In using the machine the plate to be ground is placed on the rolls and guided by hand along the grinding surface of the wheel.

The weight being taken by the rolls, the operator has only to slide the plate horizontally keeping the proper pressure against the wheel.

Instead of manipulating the plate directly by hand, a handling device may be used which will adhere to the face of the plate.

Such a device is shown in Fig. 3 wherein *h* represents a vacuum head such as shown and described in Letters Patent 1,025,692 issued to me May 7, 1912, and *i* is a bar connected with the head *h* and extending along the glass to a similar head, both being attached to the face of the glass by suction.

The rolls *e* may be of any desired length to take glass of varying widths or a second set of rolls may be used parallel with the first set to support the outer end of the narrow plate when the end is ground or the outer end may be otherwise supported.

It is not absolutely necessary that the glass should rest directly on the rolls but it may rest on a plate of wood or other suitable material which may be interposed between the glass and the rolls, or it may rest directly on the frame, the smooth surface of which will allow it to be slid in any direction.

I claim;

In a machine for grinding the edges of glass plates, the combination of a conical grinding wheel having one portion of its conical surface in an upright position, a supporting table on which the plate rests adjacent to the wheel and at right angles to the upright portion of the same, the said table being narrower than the plate whereby the rear portion of the plate may be grasped by the hands of the operator to manipulate the same, said table being hingedly mounted in front of the grinding wheel, whereby the plate may be tilted.

In testimony whereof I have affixed my signature.

HENRY G. FARLEY.